US011864258B1

(12) United States Patent
Chandra et al.

(10) Patent No.: US 11,864,258 B1
(45) Date of Patent: Jan. 2, 2024

(54) RECOVERING BEARERS AFTER SERVICE INTERRUPTION OF RELAY NODES

(71) Applicant: Sprint Spectrum LP, Overland Park, KS (US)

(72) Inventors: Amrit Kumar Chandra, Ashburn, VA (US); Charles Manganiello, Paola, KS (US); David Zhijun Sun, Broadlands, VA (US); Jay R. Chernoff, Pawleys Island, SC (US); Kristian Kai Johns, Ashburn, VA (US); Liang Li, Darnestown, MD (US); Mayur Shirwadkar, Arlington, VA (US); Neehar Kulkarni, Herndon, VA (US); Ramesh Kalathur, Fairfax, VA (US); Saravana Velusamy, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 669 days.

(21) Appl. No.: 16/883,231

(22) Filed: May 26, 2020

(51) Int. Cl.
*H04W 76/25* (2018.01)
*H04W 76/19* (2018.01)
*H04W 88/16* (2009.01)
*H04W 28/02* (2009.01)
*H04W 8/08* (2009.01)

(52) U.S. Cl.
CPC ............ *H04W 76/25* (2018.02); *H04W 8/08* (2013.01); *H04W 28/0268* (2013.01); *H04W 76/19* (2018.02); *H04W 88/16* (2013.01)

(58) Field of Classification Search
CPC . H04W 76/25; H04W 28/0268; H04W 76/19; H04W 88/16; H04W 8/08; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| 10,028,186 | B1 * | 7/2018 | Marupaduga | ......... H04W 36/26 |
| 2012/0134267 | A1 | 5/2012 | Noriega et al. | |
| 2014/0242978 | A1 * | 8/2014 | Shuman | ................ H04W 76/18 |
| | | | | 455/423 |
| 2015/0358483 | A1 * | 12/2015 | Jeong | .................... H04M 15/60 |
| | | | | 370/328 |
| 2018/0199273 | A1 * | 7/2018 | Chun | .................... H04W 76/27 |

OTHER PUBLICATIONS

Cipressi, Elena, and Maria Luisa Merani. "A comparative study on the quality of narrow-band and wide-band AMR VoLTE calls." 2019 15th International Wireless Communications & Mobile Computing Conference (IWCMC). IEEE, 2019. (Year: 2019).*

* cited by examiner

*Primary Examiner* — Sharad Rampuria
(74) *Attorney, Agent, or Firm* — Jones Robb, PLLC

(57) ABSTRACT

Recovering bearers after a service interruption of a relay node includes receiving, at a relay gateway, an instruction to modify bearers from a mobility management entity (MME), the instruction identifying one or more bearers that were in use by the relay node prior to the service interruption, identifying, at the relay gateway, at least one additional bearer in use prior to the service interruption not identified in the instruction received from the MME, and instructing the MME to create the at least one additional bearer. The at least one additional bearer can include a non-GBR bearer, such as a bearer with QCI of 1 used for VoLTE.

18 Claims, 8 Drawing Sheets

RECOVERING BEARERS AFTER SERVICE INTERRUPTION OF RELAY NODES

TECHNICAL BACKGROUND

Wireless networks incorporating access nodes, relay nodes, and other small-cell access nodes are becoming increasingly common, and may be referred to as heterogeneous networks. Relay nodes improve service quality by relaying communication between an access node, and wireless devices in the wireless network. For example, relay nodes (hereinafter, "relay nodes") may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless backhaul connection, and to deploy a radio air-interface to which wireless devices can attach.

When a relay node is connected to a donor access node, multiple radio bearers are set up on the wireless backhaul connection for different type of traffic transmissions between end-user wireless devices (attached to the relay node) and the core wireless network (to which the donor access node is coupled). The bearers can include guaranteed bit rate (GBR) bearers, and non-GBR bearers. For example, a QCI-6 bearer is set up for backhaul internet data traffic, a QCI-5 bearer is set up for control signaling traffic, and a QCI-1 bearer is set up for voice over LTE (VoLTE) traffic. The QCI-6 and OCI-5 bearers are non-GBR bearers and the QCI-1 bearer is a GBR bearer.

However, under certain circumstances, service interruptions may occur for the end user wireless devices. For example, the relay node may lose radio-frequency connectivity, or the wireless backhaul connection can suffer from interference, resulting in a loss of the radio resource control (RRC) connection between the relay node and the donor access node. In such cases, the multiple radio bearers are generally deactivated, and may be reactivated when the connection is resumed. For example, upon suffering from a loss of RRC connection, the donor access node initiates the S1 release procedure. In response, a mobility management entity may deactivate GBR bearers (QCI-1) to conserve resources for other types of transmissions. Meanwhile, a context for other non-GBR bearers (e.g. QCI-6 and QCI-5) is preserved at the MME and/or a gateway associated with the relay node (hereinafter, relay gateway). Subsequently, when the relay node resumes transmission of data, it begins by transmitting a service request to the core network via the donor access node. Upon receiving the service request, the MME sends an initial context setup request to the donor access node to set up the non-GBR bearers (e.g. QCI-6 and QCI-5). However, the MME does not set up any GBR bearers (e.g. QCI-1) since the QCI-1 bearer context of these bearers was released. The result is that the relay node can no longer use the GBR bearers that it lost. This can result in service interruptions to the relay node (and consequently to end-user wireless devices attached thereto).

Therefore, what is needed is a way to recover certain bearers associated with relay nodes after service interruptions.

Overview

Exemplary embodiments described herein include methods, systems, and processing nodes for recovering bearers after service interruptions of relay nodes. An exemplary method described herein for recovering bearers after service interruptions of relay nodes includes receiving, at a relay gateway, an instruction to modify bearers from a mobility management entity (MME), the instruction identifying one or more bearers that were in use by the relay node prior to the service interruption, identifying, at the relay gateway, at least one additional bearer in use prior to the service interruption not identified in the instruction received from the MME, and instructing the MME to create the at least one additional bearer.

An exemplary system described herein for recovering bearers after service interruptions of relay nodes includes a mobility management entity (MME) configured to generate a modify bearer request in response to receiving a service request, the modify bearer request identifying one or more bearers that were in use by a relay node prior to a service interruption, and a relay gateway communicatively coupled to the MME, the relay gateway configured to perform operations comprising receiving the modify bearer request from the MME, identifying at least one additional bearer in use prior to the service interruption not identified in the modify bearer request, and instructing the MME to create the at least one additional bearer.

An exemplary processing node described herein for recovering bearers after service interruptions of relay nodes is configured to perform operations including receiving an instruction to modify bearers from a mobility management entity (MME), the instruction identifying one or more bearers that were in use by a relay node prior to the service interruption, identifying at least one additional bearer in use prior to the service interruption not identified in the instruction received from the MME, and instructing the MME to create the at least one additional bearer

DETAILED DESCRIPTION

Exemplary embodiments described herein include systems, methods, and processing nodes for recovering bearers after service interruptions of relay nodes. A service interruption can cause a service request procedure to be initiated, which results in the MME sending a modify bearer request to a relay gateway. The modify bearer request identifies which bearers are up at the relay node and/or given access point name (APN). The relay gateway is configured to check if the APN identified in the modify bearer request message received from the MME for is associated with any dedicated bearers. The relay gateway may store a local configuration associating the APN of a relay node (or any other node) with different bearers, including GBR and non-GBR bearers (such as QCI-6 as a default bearer, and QCI-5 and QCI-1 dedicated bearers for the APN). Upon determining that the modify bearer request does not include all the bearers with which the the relay node's APN is associated, the relay gateway transmits a create bearer request message to the MME to initiate set up of the missing bearers. In an exemplary embodiment, the missing bearer is a QCI-1 bearer, which can be a GBR bearer.

Further, in addition to the systems and methods described herein, these operations may be implemented as computer-readable instructions or methods, and processing nodes on the network for executing the instructions or methods. For example, a processing node coupled to a donor access node, a scheduler within the donor access node, or a controller node may be configured to perform the operations described herein. These and other embodiments are further described with reference to FIGS. 1-8 below.

Figure 1:
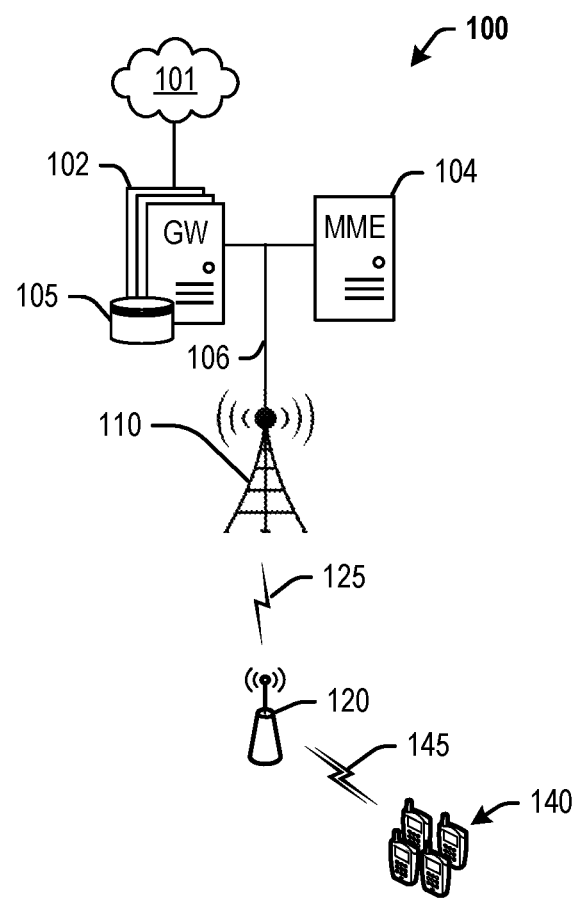
FIG. 1 depicts an exemplary system for recovering bearers after service interruptions of relay nodes.

FIG. 1 depicts an exemplary system 100 comprising a communication network 101, gateway node(s) 102, mobility management entity (MME) 104, access node 110, relay node 120, and wireless devices 140. In other embodiments, any other combination of donor access nodes, relay nodes, and wireless devices may be evident to those having ordinary skill in the art in light of this disclosure. In this exemplary embodiment, access node 110 may be a macrocell access node configured to deploy a wireless air-interface to which relay node 120 and wireless devices 140 can attach. For example, relay node 120 may be configured to communicate with access node 110 over communication link 125, hereinafter referred to as a wireless backhaul or simply "backhaul." Relay node 120 is further configured to deploy an additional wireless air-interface to which wireless devices 140 can attach. Relay node 120 is thus configured to relay data between donor access node 110 and wireless devices 140, such that wireless devices 140 may access network services using relay node 120, rather than overload donor access node 110, which may be serving numerous other devices (not shown herein). Moreover, wireless devices that are outside a coverage area of access node 110 may access network services from donor access node 110 by virtue of being connected to relay node 120.

Further, as described herein, relay node 120 may lose radio-frequency connectivity, or the wireless backhaul connection 125 can suffer from interference, resulting in a loss of the radio resource control (RRC) connection between the relay node 120 and the donor access node 110. In such cases, the donor access node 110 initiates an S1 release procedure. In response, MME 104 may deactivate GBR bearers (QCI-1) to conserve resources for other types of transmissions. Meanwhile, a context for other non-GBR bearers (e.g. QCI-6 and QCI-5) is preserved at the MME 104 and/or gateway(s) 102 (which include at least one relay gateway). Subsequently, when the relay node 120 resume transmission of data, it begins by transmitting a service request to the core network via the donor access node 110. Upon receiving the service request, the MME 104 sends an initial context setup request to the donor access node 110 to set up the non-GBR bearers (e.g. QCI-6 and QCI-5). However, the MME 104 does not set up any GBR bearers (e.g. QCI-1) since the QCI-1 bearer context of these bearers was released.

Thus, according to embodiments described herein, a processing node communicatively coupled to gateway(s) 102 can be configured to recover the lost bearers by receiving, at a relay gateway, an instruction to modify bearers from the MME 104. The instruction identifies one or more bearers that were in use by the relay node 120 prior to the service interruption. Upon receipt of the message, at least one additional bearer in use prior to the service interruption is determined as being not identified in the message received from the MME 104. Upon determining said at least one additional bearer, an instruction is transmitted to the MME 104 to create the at least one additional bearer. For example, the instruction can include a create bearer request. In response to receiving the create bearer request, the MME 104 is configured to set up the at least one additional bearer, e.g. the GBR bearer QCI-1. The GBR bearer may include a voice over long-term-evolution (VOLTE) bearer. Further, determining that the at least one additional bearer is not identified in the instruction comprises referring to a local database 105 at the relay gateway 102, the local database 105 comprising a list of all bearers associated with an access point name (APN) corresponding to the relay node 140.

Access node 110 can be any network node configured to provide communication between wireless devices 140 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further relay node 120 may comprise any short range, low power, small-cell access nodes such as a microcell access node, a picocell access node, a femtocell access node, or a home eNodeB device. In addition, relay node 120 may comprise a small-cell access node paired with a relay wireless device configured to communicate over backhaul 125, as further described herein.

Access node 110 and relay node 120 can each comprise a processor and associated circuitry to execute or direct the execution of computer-readable instructions to perform operations such as those further described herein. Briefly, access node 110 and relay node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 120 can receive instructions and other input at a user interface. Access node 110 communicates with gateway node 102 and MME 104 via communication link 106. Access node 110 and relay node 120 may communicate with each other, and other access nodes (not shown), using wireless link or backhaul 125, or a wired link such as an X2 link. Components of exemplary access nodes 110 and relay node 120 are further described with reference to FIGS. 2-4.

Wireless devices 140 may be any device, system, combination of devices, or other such communication platform capable of communicating wirelessly with access node 110 and/or relay node 120 using one or more frequency bands deployed therefrom. Each of wireless devices 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrie Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. Gateway node(s) 102 can further include a relay S-GW and relay P-GW that perform equivalent functions as S-GW and P-GW but for relay node 120. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. In an exemplary embodiment, a relay gateway from among gateway node(s) 102 includes a database 105 for storing bearer information associated with different access point names (APNs) corresponding to one or more relay nodes, etc. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

MME 104 can be any network node configured to communicate signaling and/or control information over system 100. MME 104 can be configured to initiate paging and authentication of wireless devices in system 100, to select appropriate gateways during the initial registration and connection process, and to set up bearers between wireless devices and their respective gateways. The MME 104 can connect to the donor access node 110 via a S1-MME interface and to relay gateway 102 through a S11 interface. MME 104 can be a standalone computing device, computing system, or network component, and can be accessible, for example, by a wired or wireless connection, or through an indirect connection such as through a computer network or communication network. One of ordinary skill in the art would recognize that MME 104 is not limited to any specific technology architecture, such as Long Term Evolution (LTE) or 5G NR, and can be used with any network architecture and/or protocol.

MME 104 can comprise a processor and associated circuitry to execute or direct the execution of computer-readable instructions to obtain information. MME 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, and combinations thereof. For example, a processing node within MME 104 can perform one or more of the operations described herein. Further, MME 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access node 110, relay node 120, and/or network 101.

Figure 2:
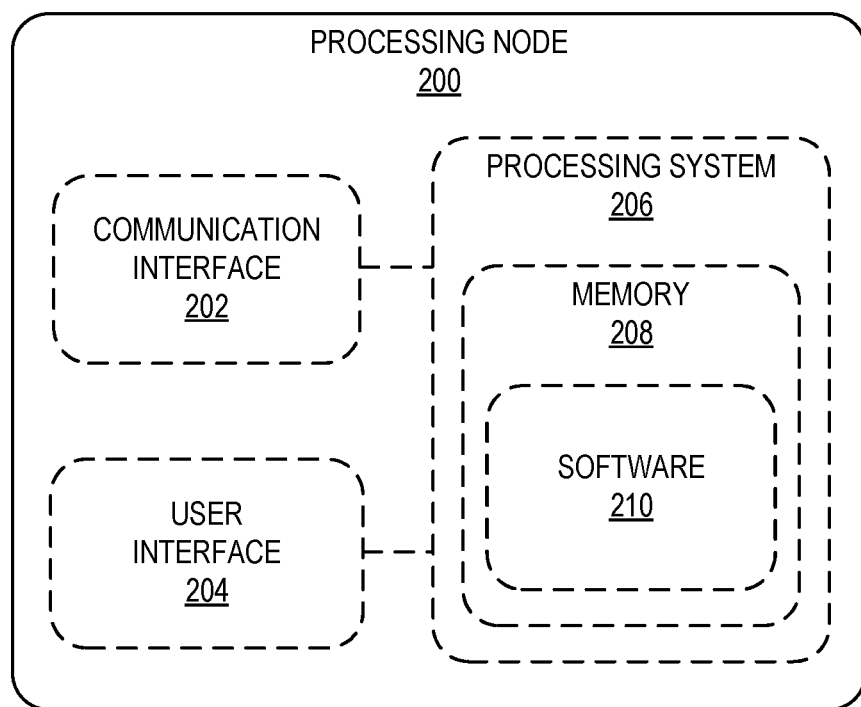
FIG. 2 depicts an exemplary processing node recovering bearers after service interruptions of relay nodes.

FIG. 2 depicts an exemplary processing node for recovering bearers after service interruptions of relay nodes. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 includes instructions for recovering bearers after a service interruption of a relay node, including receiving an instruction to modify bearers from a mobility management entity (MME), the instruction identifying one or more bearers that were in use by the relay node prior to the service interruption. Responsive to receiving the instruction, at least one additional bearer in use prior to the service interruption not identified in the instruction received from the MME is identified (from, for example, by referring to an APN and corresponding list of associated bearers stored in a local database), and the MME is instructed to create the at least one additional bearer. In an exemplary embodiment, the instruction from the MME comprises a modify bearer request. The MME may be configured to generate the modify bearer request in response to receiving a service request from a donor access node to which the relay node is attached. Further, instructing the MME to create the at least one additional bearer comprises transmitting a create bearer request to the MME. In response to receiving the create bearer request, the MME is configured to set up the at least one additional bearer. In an exemplary embodiment, the one or more bearers in the instruction from the MME comprise non guaranteed-bit-rate (non GBR) bearers. Further, the at least one additional bearer comprises a GBR bearer. In an exemplary embodiment, the GBR bearer comprises a voice over long-term-evolution (VOLTE) bearer.

Figure 3:
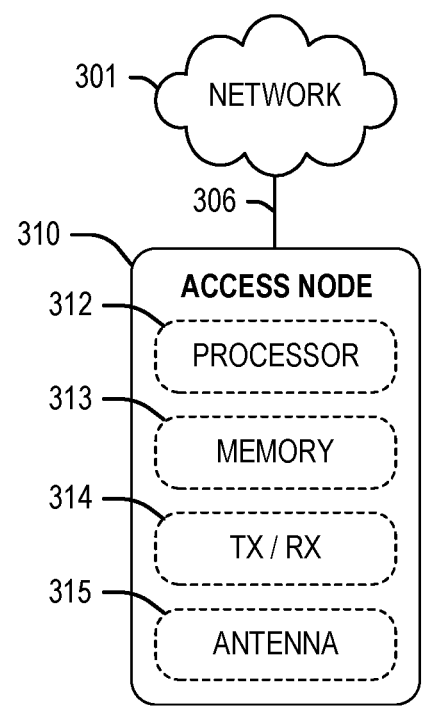
FIG. 3 depicts an exemplary donor access node.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless devices and relay nodes (not shown herein). Instructions stored on memory 313 can include deploying an air-interface carrier to which wireless devices and relay nodes can attach to access network services.

Figure 4:
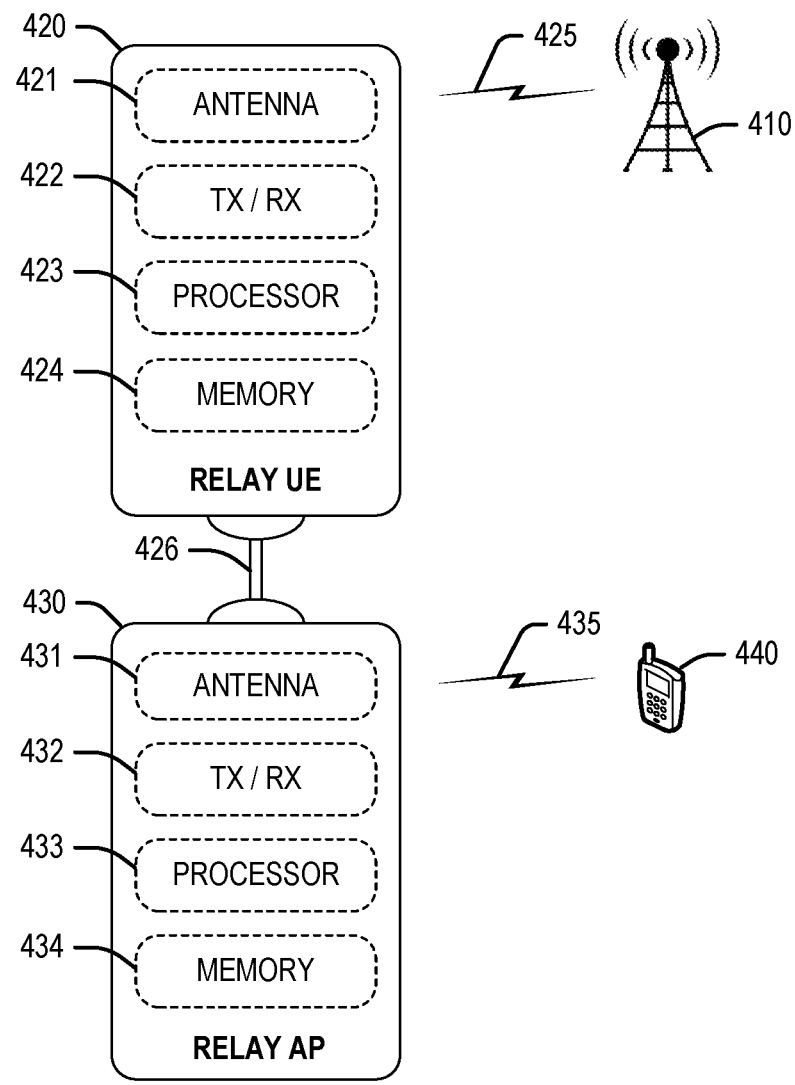
FIG. 4 depicts an exemplary relay node comprising a relay wireless device and a relay access point.

FIG. 4 depicts an exemplary relay node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
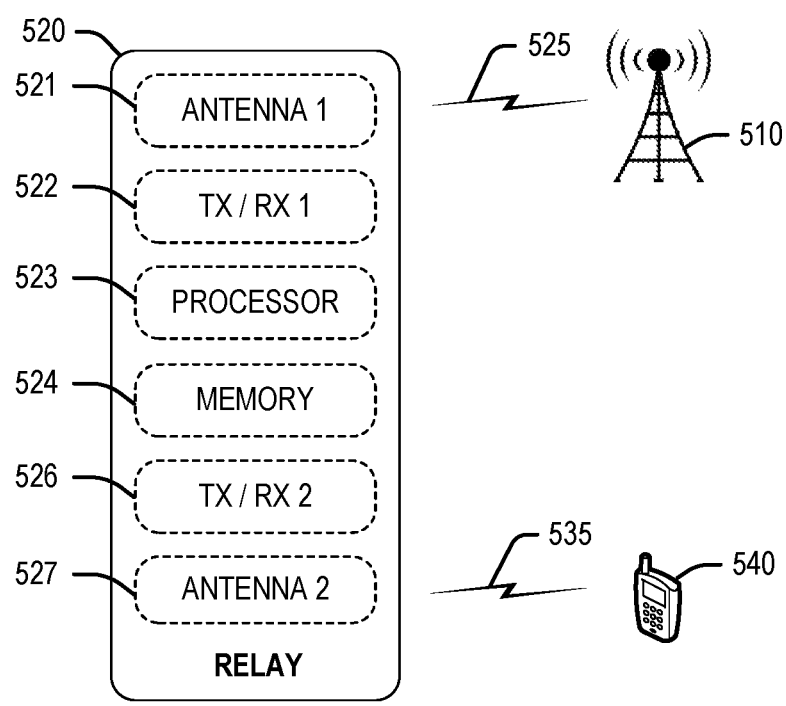
FIG. 5 depicts another exemplary relay node.

In another exemplary embodiment, the relay node may integrate components of a relay wireless device and a relay access point into a single unit. FIG. 5 depicts such an exemplary relay node 520. Relay node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay node 520 further includes another transceiver 526 and antenna 527 for enabling communication with wireless device 520. Relay node 520 can perform operations similar to those described with respect to FIG. 4.

In an embodiment, the relay nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 6:
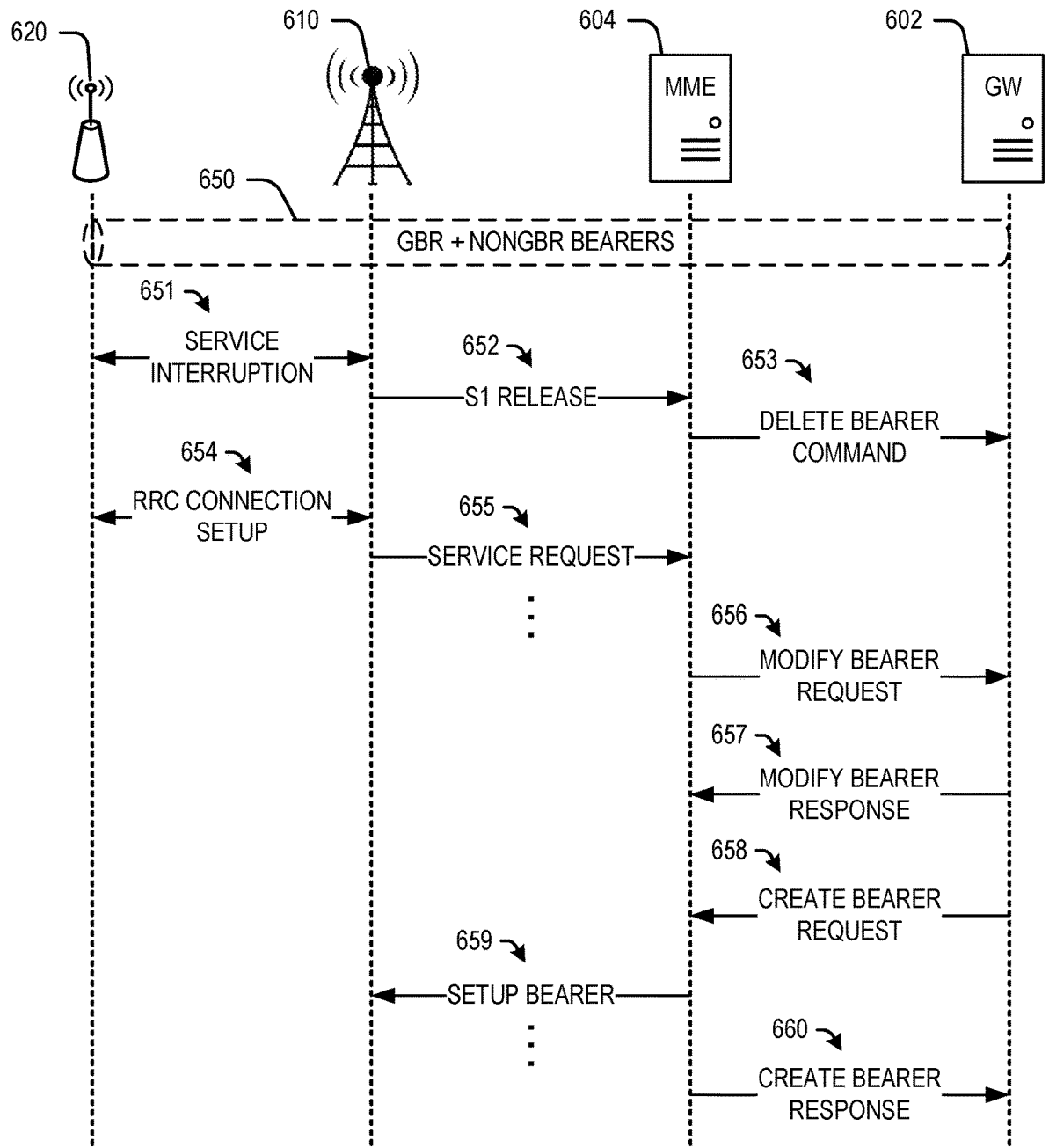
FIG. 6 depicts an exemplary network flow for recovering bearers after service interruptions of relay nodes.

FIG. 6 depicts an exemplary network flow for communicating with a wireless device via at least two access nodes. The exemplary network flow of FIG. 6 may be implemented using components similar to those depicted in system 100, such as a relay node 620, donor access node 610, MME 604, and gateway 602. Gateway 602 may comprise a relay gateway such as a relay serving gateway (S-GW) or packet data network gateway (P-GW), and can be communicatively coupled to MME 604 by any capable interface, such as an S11 interface. Similarly, MME 604 may be communicatively coupled to donor access node 610 via any capable interface, such as an S1-MME interface. Finally, donor access node 610, relay node 620, and wireless device 640 communicate with one another via any number of wireless air-interfaces using 5G-uu, LTE-uu, or other wireless interfaces. Although FIG. 6 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional components, such as routers, gateways, proxy servers, home subscriber servers (HSS), and signaling performed between elements, may be apparent to those having ordinary skill in the art in light of this disclosure.

Prior to the beginning of the flow, relay node 620 is illustrated as being in communication with at least gateway 602 via a plurality of bearers 650, including GBR and non-GBR bearers. GBR bearers are guaranteed a bandwidth of the bearer as indicated by one or more QoS parameters. For example any dedicated EPS bearer can be a GBR bearer and, in contrast, no default EPS bearer can be a GBR bearer. The quality of service class identifier (QCI) of a GBR bearer can range from 1 to 4. Further QCI values provided in the 3GPP specification include 65, 66, 75, 82, 83, 84, and 85. Thus, in an exemplary embodiment, a GBR bearer for VoLTE service has a QCI of 1, or any of the above values. Meanwhile, non-GBR bearers are best-effort bearers, which are not guaranteed a bandwidth. For example all default EPS bearers are non-GBR bearers and, in contrast, dedicated EPS bearers can either be GBR or non-GBR bearers. The QCI of a GBR bearer can range from 5 to 9, with additional values provided in the 3GPP specification including 69, 70, 79, and 80. Thus, in an exemplary embodiment, non-GBR bearers associated with the relay node 620 can include QCIs 5 and 6, or any of the above values. Further, the bearers associated with relay node 620 can be associated with an APN of relay node 620, as further described below.

The network flow of FIG. 6 begins with a service interruption. The service interruption may arise as a result of the relay node 620 losing radio-frequency connectivity with donor access node 610, or the wireless backhaul connection suffering from excessive interference, resulting in a loss of the radio resource control (RRC) connection between the relay node 610 and the donor access node 620. Upon suffering from a loss of RRC connection, the donor access node 610 initiates the S1 release procedure at 652. The S1 release procedure means releasing the S1 signaling and RRC connections in control plane, and the downlink S1 bearer and data radio bearer (DRB) in the user plane associated with the relay node 620 and/or end-user wireless devices attached thereto. From the perspective of the relay node 620, it means losing the RRC connection and DRB in control and user planes, respectively. Once the S1 connection is released, an EPC connection management (ECM) function between the relay node 620 and the MME 604 is lost, and all contexts associated with the relay node 620 are deleted at the donor access node 610, and a delete bearer command is transmitted at 653. In other words, MME 604 may deactivate GBR bearers (QCI-1) to conserve resources for other types of transmissions. Meanwhile, a context for other non-GBR bearers (e.g. QCI-6 and QCI-5) is preserved at the MME 604 and/or gateway 602).

Subsequently, when the relay node resumes transmission of data, it begins by transmitting a service request to the core network via the donor access node. This can include initiating an RRC connection setup 654, which can include a random access procedure, etc. In response to the RRC connection setup, the donor access node 610 transmits the service request to MME 604 at 655. After receiving the service request, the MME 604 generates an Initial Context setup request to the donor access node 610 to set up the bearers for which it has the context stored. The MME 604 does not include the GBR bearer (e.g. QCI-1) in to the donor access node is when it was previously released. The donor access node sends an Initial Context setup response to the MME 604 without the GBR bearer. Thus, as described herein, MME 604 sends a modify bearer request at 656 to gateway 602. The modify bearer request identifies bearers for which the context is set up/stored.

The gateway 602 is configured to check if the APN identified in the modify bearer request message received from the MME 604 at 656 is associated with any dedicated bearers. The APN comprises a label according to DNS naming conventions describing the access point to core network entities (such as MME 604 and relay gateway 602). The relay gateway 602 may store a local configuration associating the APN of relay node 620 (and any other node having an access point name) with different bearers, including GBR and non-GBR bearers (such as QCI-6 as a default bearer, and QCI-5 and QCI-1 dedicated bearers for the APN). Upon determining that the modify bearer request does not include all the bearers with which the relay node's APN is associated, the relay gateway 602 transmits a create bearer request message to the MME at 658, the create bearer request comprising an instruction to initiate set up of the missing bearers. Upon receiving the create bearer request, at 659 the MME 604 sets up the dedicated bearer at the donor access node 610 which includes transmitting an identifier of the default bearer, QoS characteristics for the incoming and outgoing flows, and then at 660 responds to the relay gateway 602 with a create bearer response message. Thus, the session is resumed between the relay node 620 and the relay gateway 602.

Figure 7:
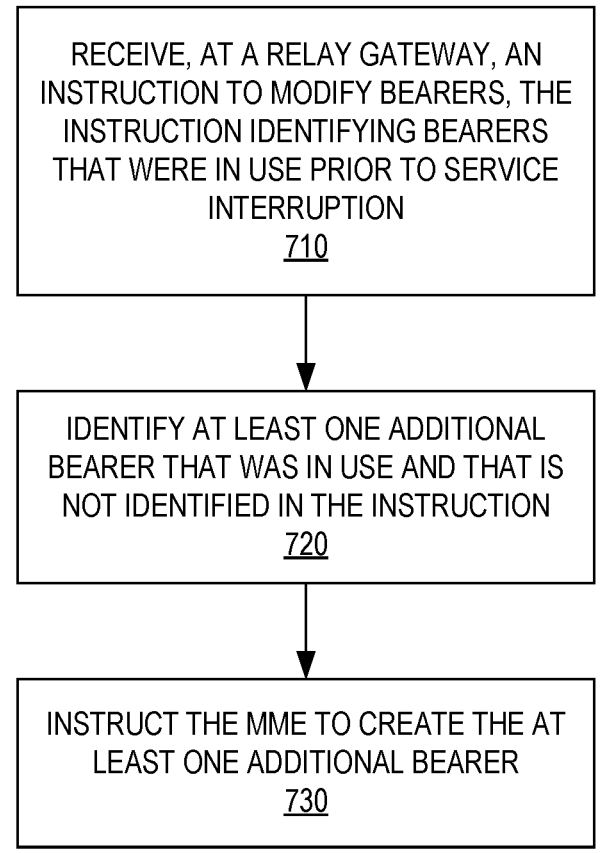
FIG. 7 depicts an exemplary method for recovering bearers after service interruptions of relay nodes.

FIG. 7 depicts an exemplary method for recovering bearers after service interruptions of relay nodes. The exemplary method of FIG. 7 may be implemented using components similar to those depicted herein, including but not limited to relay gateways 102, 602. Although FIG. 7 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 710, a relay gateway receives an instruction to modify bearers from an MME. The MME may transmit a modify bearer request to the relay gateway in response to determining that a relay node is attempting to resume transmission of data after a service interruption. The relay node (or donor access node) may transmit a service request to the core network, responsive to which the MME sends a modify bearer request to the relay gateway. The modify bearer request identifies bearers for which the context is set up/stored. The bearers identified may not include dedicated or GBR bearers, since the context of these bearers may have been released during the service interruption.

Therefore, at 720, the relay gateway may check if the APN identified in the modify bearer request message received from the MME is associated with any dedicated bearers. The APN comprises a label according to DNS naming conventions describing the access point to core network entities. The relay gateway may store a local configuration associating the APN of the relay node (and any other node having an access point name) with different bearers, including GBR and non-GBR bearers (such as QCI-6 as a default bearer, and QCI-5 and QCI-1 dedicated bearers for the APN). Upon determining that the modify bearer request does not include all the bearers with which the relay node's APN is associated, at 730, the relay gateway transmits a create bearer request message to the MME, the create bearer request comprising an instruction to initiate set up of the missing bearers. Upon receiving the create bearer request, the MME may set up the dedicated bearer at the donor access node.

Figure 8:
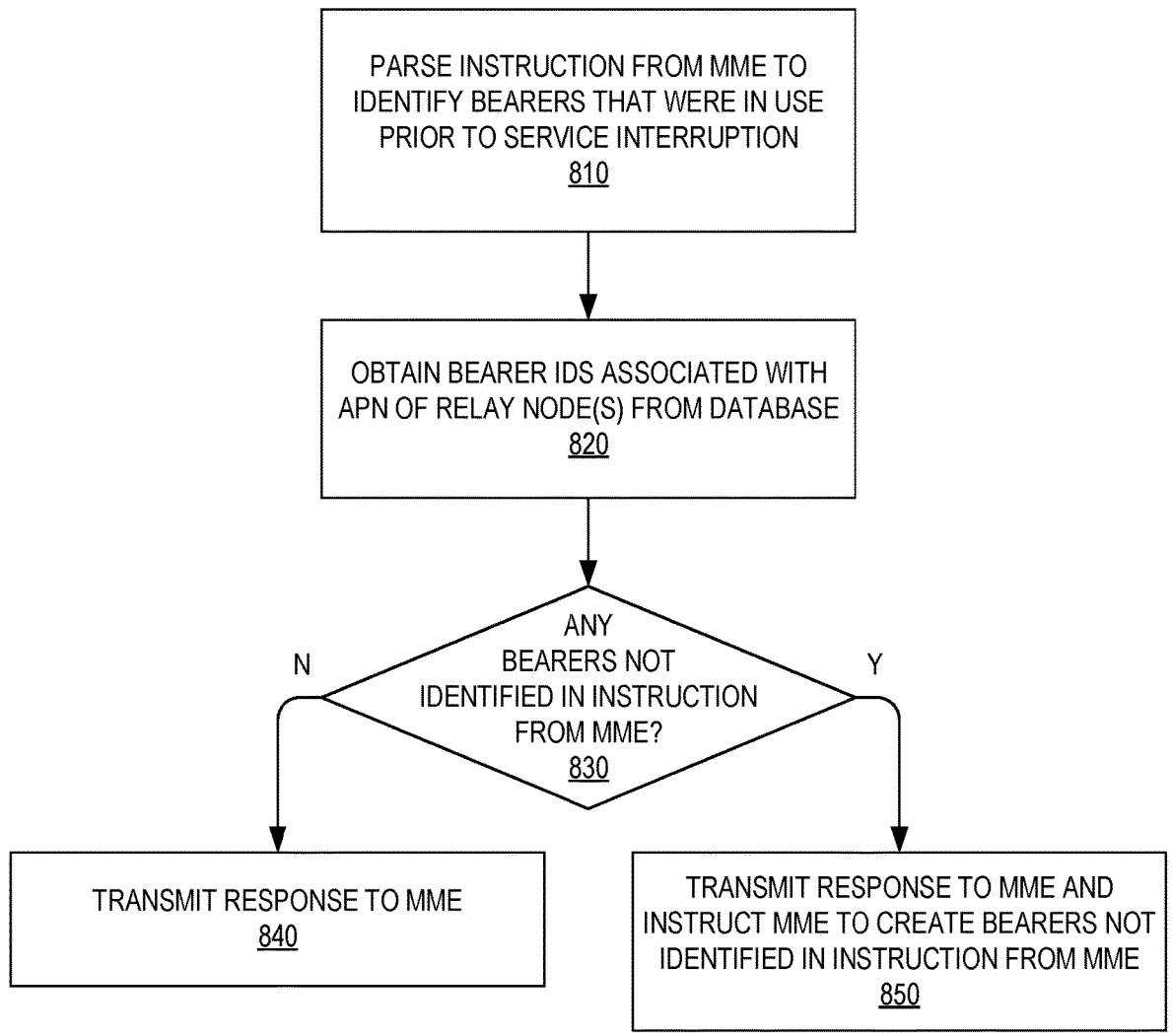
FIG. 8 depicts another exemplary method for recovering bearers after service interruptions of relay nodes.

FIG. 8 depicts another exemplary method for recovering bearers after service interruptions of relay nodes. The exemplary method of FIG. 8 may be implemented using components similar to those depicted herein, including but not limited to relay gateways 102, 602. Although FIG. 8 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 810, a relay gateway parses an instruction from an MME to identify bearers that were in use prior to a service interruption as described herein. The relay gateway may receive the instruction to modify bearers from the MME in response to determining that a relay node is attempting to resume transmission of data after a service interruption. The relay node (or donor access node) may transmit a service request to the core network, responsive to which the MME sends a modify bearer request to the relay gateway. The modify bearer request identifies bearers for which the context is set up/stored. The bearers identified may not include dedicated or GBR bearers, since the context of these bearers may have been released during the service interruption.

Therefore, at 820, the relay gateway may obtain bearer identifiers associated with APNs of one or more relay nodes from a local database, which includes checking if the APN identified in the modify bearer request message received from the MME is associated with any dedicated bearers. The APN comprises a label according to DNS naming conventions describing the access point to core network entities. The relay gateway may store a local configuration associating the APN of the relay node (and any other node having an access point name) with different bearers, including GBR and non-GBR bearers (such as QCI-6 as a default bearer, and QCI-5 and QCI-1 dedicated bearers for the APN). Further, at 830, the relay gateway determines if any of the bearer identifiers associated with the APN are not in the instruction received from the MME. Upon determining that the modify bearer request does not include all the bearers with which the relay node's APN is associated, at 850, the relay gateway transmits a create bearer request message to the MME, the create bearer request comprising an instruction to initiate set up of the missing bearers, along with a response. Upon receiving the create bearer request, the MME may set up the dedicated bearer at the donor access node. Meanwhile, if no bearers are identified that are not in the modify bearer message, then at 840 a response is transmitted to the MME without the create bearer request.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for recovering bearers after a service interruption of a relay node, the method comprising:

receiving, at a relay gateway, an instruction to modify bearers from a mobility management entity (MME), the instruction identifying one or more bearers that were in use by the relay node prior to the service interruption, wherein the one or more bearers in the instruction from the MME comprise non-guaranteed-bit-rate (non-GBR) bearers;

identifying, at the relay gateway, at least one additional bearer in use prior to the service interruption not identified in the instruction received from the MME by referring to a database comprising a list of bearers associated with the relay node; and instructing the MME to create the at least one additional bearer, wherein the at least one additional bearer is GBR bearer that comprises a voice over long-term-evolution (VOLTE) bearer.

2. The method of claim 1, wherein the instruction from the MME comprises a modify bearer request.

3. The method of claim 2, wherein the MME is configured to generate the modify bearer request in response to receiving a service request from a donor access node to which the relay node is attached.

4. The method of claim 1, wherein instructing the MME to create the at least one additional bearer comprises transmitting a create bearer request to the MME.

5. The method of claim 4, wherein in response to receiving the create bearer request, the MME is configured to set up the at least one additional bearer.

6. The method of claim 1, wherein the database comprises a local database at the relay gateway, the local database comprising the list of bearers, and the list is a list of all bearers associated with the relay node.

7. The method of claim 1, wherein the list of bearers is associated with an access point name (APN) of the relay node.

8. The method of claim 7, wherein the APN comprises a label according to DNS naming conventions describing the access point to core network entities.

9. The method of claim 1, wherein the database comprises a plurality of database names (APNs) corresponding to a plurality of relay nodes, the plurality of relay nodes comprises the relay node, the plurality of APNs comprises an APN for the relay node, and the list of bearers is associated with the APN.

10. A system for recovering bearers after a service interruption of a relay node, the system comprising:

a mobility management entity (MME) configured to generate a modify bearer request in response to receiving a service request, the modify bearer request identifying one or more bearers that were in use by a relay node prior to a service interruption; and a relay gateway communicatively coupled to the MME, the relay gateway configured to perform operations comprising:

receiving the modify bearer request from the MME, wherein the one or more bearers in the modify bearer request from the MME comprise non-guaranteed-bit-rate (non-GBR) bearers;

identifying at least one additional bearer in use prior to the service interruption not identified in the modify bearer request by referring to a database comprising a list of bearers associated with the relay node; and instructing the MME to create the at least one additional bearer, wherein the at least one additional bearer is GBR bearer that comprises a voice over long-term-evolution (VOLTE) bearer.

11. The system of claim 10, wherein the instruction from the MME comprises a modify bearer request.

12. The system of claim 11, wherein the MME is configured to generate the modify bearer request in response to receiving a service request from a donor access node to which the relay node is attached.

13. The system of claim 10, wherein instructing the MME to create the at least one additional bearer comprises transmitting a create bearer request to the MME.

14. The system of claim 13, wherein in response to receiving the create bearer request, the MME is configured to set up the at least one additional bearer.

15. A processing node for recovering bearers after a service interruption of a relay node, the processing node being configured to perform operations comprising:

receiving an instruction to modify bearers from a mobility management entity (MME), the instruction identifying one or more bearers that were in use by a relay node prior to the service interruption, wherein the one or more bearers in the instruction from the MME comprise non-guaranteed-bit-rate (non-GBR) bearers;

identifying at least one additional bearer in use prior to the service interruption not identified in the instruction received from the MME by referring to a database comprising a list of bearers associated with the relay node; and instructing the MME to create the at least one additional bearer, wherein the at least one additional bearer is GBR bearer that comprises a voice over long-term-evolution (VOLTE) bearer.

16. The processing node of claim 15, wherein the instruction from the MME comprises a modify bearer request.

17. The processing node of claim 16, wherein the MME is configured to generate the modify bearer request in response to receiving a service request from a donor access node to which the relay node is attached.

18. The processing node of claim 15, wherein instructing the MME to create the at least one additional bearer comprises transmitting a create bearer request to the MME.

* * * * *